United States Patent
Wang et al.

(10) Patent No.: US 8,852,457 B2
(45) Date of Patent: Oct. 7, 2014

(54) METHOD FOR PURIFICATION AND CONDITIONING OF CRUDE SYNGAS BASED ON PROPERTIES OF MOLTEN SALTS

(75) Inventors: Xiaobo Wang, Guangzhou (CN); Zengli Zhao, Guangzhou (CN); Haibin Li, Guangzhou (CN); Anqi Liu, Guangzhou (CN); Hongxiang Wu, Guangzhou (CN)

(73) Assignee: Guangzhou Institute of Energy Conversion, Chinese Academy of Sciences, Guangzhou (CN)

( * ) Notice: Subject to any disclaimer, the term of this patent is extended or adjusted under 35 U.S.C. 154(b) by 0 days.

(21) Appl. No.: 14/125,857

(22) PCT Filed: May 24, 2012

(86) PCT No.: PCT/CN2012/076001
§ 371 (c)(1),
(2), (4) Date: Dec. 12, 2013

(87) PCT Pub. No.: WO2012/174968
PCT Pub. Date: Dec. 27, 2012

(65) Prior Publication Data
US 2014/0131621 A1 May 15, 2014

(30) Foreign Application Priority Data
Jun. 20, 2011 (CN) .......................... 2011 1 0166589

(51) Int. Cl.
*C01B 3/38* (2006.01)
*C10K 1/00* (2006.01)
(Continued)

(52) U.S. Cl.
CPC . *C01B 3/56* (2013.01); *C10K 1/004* (2013.01); *C10K 3/001* (2013.01); *B01D 2251/604* (2013.01); *C10K 1/024* (2013.01); *C10K 3/006* (2013.01); *B01D 2251/306* (2013.01); *C10K 3/04* (2013.01); *B01D 2257/408* (2013.01); *B01D 2256/16* (2013.01); *B01D 2257/30* (2013.01); *B01D 2257/308* (2013.01); *B01D 2257/2045* (2013.01); *C10K 3/026* (2013.01); *B01D 53/68* (2013.01); *B01D 2256/20* (2013.01); *C10K 3/06* (2013.01); *B01D 2251/606* (2013.01); *B01D 53/48* (2013.01); *B01D 2251/304* (2013.01); *C01B 3/50* (2013.01); *B01D 2257/304* (2013.01); *C10K 1/34* (2013.01)
USPC ..................................................... 252/373

(58) Field of Classification Search
USPC ..................................................... 252/373
See application file for complete search history.

(56) References Cited

U.S. PATENT DOCUMENTS

2009/0018222 A1   1/2009 Klepper et al.

FOREIGN PATENT DOCUMENTS

| CN | 101157443 A | 4/2008 |
| CN | 101224871 A | 7/2008 |

(Continued)

OTHER PUBLICATIONS

International Search Report of PCT/CN2012/076001, mailing date of Sep. 6, 2012.

*Primary Examiner* — Melvin C Mayes
*Assistant Examiner* — Kenneth Vaden
(74) *Attorney, Agent, or Firm* — Westerman, Hattori, Daniels & Adrian, LLP

(57) ABSTRACT

A method for purification and conditioning of crude syngas based on properties of molten salts, includes removing particles at a high-temperature by enabling the high-temperature crude syngas produced by a gasification device to firstly pass through a high-temperature particle removal device to remove solid particles in the gas; removing hydrocarbons in the presence of oxygen by introducing an oxidant into the crude syngas after treatment, selectively removing the hydrocarbons in the crude syngas and simultaneously utilizing high temperature produced by oxidation of the hydrocarbons to crack tar; and removing gas pollutants and conditioning by introducing the obtained crude syngas into molten salts medium, removing pollutants containing sulfur and chlorine in the crude syngas, and simultaneously adjusting the $H_2/CO$ ratio of the syngas to obtain purified syngas.

8 Claims, 1 Drawing Sheet

(51) Int. Cl.
  *C10K 3/00* (2006.01)
  *C10K 1/02* (2006.01)
  *C10K 3/04* (2006.01)
  *C10K 3/02* (2006.01)
  *B01D 53/68* (2006.01)
  *C01B 3/56* (2006.01)
  *C10K 3/06* (2006.01)
  *B01D 53/48* (2006.01)
  *C01B 3/50* (2006.01)
  *C10K 1/34* (2006.01)

(56) References Cited

FOREIGN PATENT DOCUMENTS

| | | | |
|---|---|---|---|
| CN | 101374759 A | | 2/2009 |
| CN | 101445750 A | | 6/2009 |
| CN | 101802143 A | | 8/2010 |
| CN | 201729816 U | | 2/2011 |
| CN | 102259835 A | | 11/2011 |
| GB | 1480001 A | * | 7/1977 |
| WO | 2009/009388 A2 | | 1/2009 |

* cited by examiner

METHOD FOR PURIFICATION AND CONDITIONING OF CRUDE SYNGAS BASED ON PROPERTIES OF MOLTEN SALTS

FIELD OF THE INVENTION

The invention relates to the technical field of energy utilization, in particular to a new method for purification and conditioning of crude syngas.

BACKGROUND OF THE INVENTION

Along with the exploitation of large quantity of petroleum resources, the world petroleum resources are expected to be depleted within future 50-100 years. In recent years, frequent fluctuations have appeared in petroleum price, and the rapid development in scientific research and industrial exploration of synthesis of chemical products and liquid fuels, refined from petroleum in the past, by utilizing syngas has been realized.

The syngas refers to mixed gas taking $H_2$ and CO as main components, and is widely applied to synthesis of fine chemical products, industrial synthesis of ammonia, synthesis of methanol, fuel cells, power generation by gas turbines and the like. In 2010, China consumed 2.4 billion tons of coal, wherein about 36% was used for preparing the syngas by gasification and then used for indirect synthesis of the chemical products and the liquid fuels. Meanwhile, technologies for producing the syngas by gasification of biomass, municipal solid waste and industrial wastes are focal points and hotspots in the development directions of utilization of those energy. However, the $H_2/CO$ ratio in the crude syngas obtained by gasification is generally low (usually 0.5-1), the crude syngas contains a small quantity of tar, pollutants containing S, N and Cl (such as HCl, $H_2S$, HCN, $NH_3$, $CS_2$, COS and the like) and gaseous hydrocarbons (such as $CH_4$, $C_2H_2$, $C_2H_4$ and the like), and these hydrocarbons may cause carbon deposition on catalysts and cause deactivation of catalysts, meanwhile consume the compression work and reduce the efficiency of the system, so that the quality requirements of common synthesis processes on the syngas can only be met by selectively converting or removing the above components before synthesis, and a purification and conditioning technology of the crude syngas has great application prospects.

The purification and conditioning process of the syngas generally comprises $H_2/CO$ adjustment, separation of carbon dioxide, removal of tar, removal of S/Cl/N pollutants and other processes. At present, in the above process, all the steps are completed in different reactors respectively in a modular stacking way in general. Although there have been intensively studied and have certain industrial applications on those modular stacking way. The current modular stacking step-by-step purification and conditioning process also has several obvious disadvantages: 1. the process flow is long, and the investment cost is high. The purification and conditioning process is performed in different reactors step by step, so investment cost in space, reaction equipment and auxiliary facilities is increased. 2. All the process steps in purification and conditioning interfere with each other, and the difficulty in operation and design is large. For example, it is difficult to completely remove $CO_2$ at high temperature, and although the removal effect at low temperature is better, the follow-up sulfur removal and chlorine removal effect will be affected; the crude syngas generally simultaneously contains the pollutants containing S and Cl, but the pollutants containing Cl can cause the deactivation of a desulfurization catalyst; and the S and the Cl pollutants can also deactivate a tar cracking catalyst, if the S and the Cl are firstly removed and then the tar is subjected to catalytic cracking, as the operating temperature of a desulfurization and dechlorination agent is lower than that of a tar cracking catalyst, the temperature of the crude syngas needs to be adjusted, and the heat loss of the system is further caused. These problems cause a certain difficulty to design of the process and the safety operation of the system.

A deep purification method of syngas is disclosed in Patent CN 101224871, in which the crude syngas passes through a fine hydrolysis catalyst, a fine desulfurization agent, a protective agent, a deoxidization agent and a dearsenication agent so that the total sulfur ($H_2S+COS$) is less than 0.01 ppm, namely 10 ppb, the chlorine is less than 0.01 ppm, namely 10 ppb, carbonyl metal compounds are less than 0.02 ppm, namely 20 ppb, oxygen is less than 1 ppm, arsenic is less than 0.02 ppm, namely 20 ppb, and further the purpose of deep purification is achieved. The method has more process steps and complex process. A liquid nitrogen washing device for purifying syngas is provided in Patent CN 201729816U. A leading-out position after cooling of a first raw material gas cooler and an entering position for further entering a second cooler are arranged to enable a temperature splitting point of the syngas to be far away from a dew point of a methane fraction; and furthermore, the leading-out position from the second cooler to a raw material gas separator is arranged to enable the temperature to be lower than the dew point of the methane fraction, and $CH_4$ can be effectively separated and recovered. The method can not simultaneously purify S, Cl and other pollutants in the syngas. A method for synchronously making syngas and metal zinc is disclosed in Patent CN 101157443. In molten salts reactor, a carbonate molten salts is taken as a reaction medium, oxidation and reduction reactions are performed through methane and zinc oxide powder, and mixed gas of hydrogen and carbon monoxide as well as the metal zinc can be synchronously generated. The method can not synchronously adjust the $H_2/CO$ and crack the tar.

All the above patents do not refer to purification methods of the crude syngas, which selectively convert the hydrocarbons in the crude syngas in the presence of oxygen, then utilize the molten salts to absorb the pollutants in the crude syngas and simultaneously adjust the $H_2/CO$ ratio.

SUMMARY OF THE INVENTION

An object of the invention is to overcome the disadvantages of longer process flow, high investment cost, mutual interference of all process steps in purification and conditioning and large difficulty in operation and design of the prior art and further provide a new method for purification and conditioning of crude syngas based on properties of molten salts.

In order to realize the above object, the invention adopts the following technical solution: the new method for purification and conditioning of the crude syngas based on the properties of the molten salts comprises the following steps:

(1) Particles removed at high-temperature: enabling the high-temperature crude syngas produced by a gasification device to firstly pass through a high-temperature particle removal device to remove solid particles in the gas;

(2) Removal of hydrocarbons in the presence of oxygen: introducing an oxidant into the crude syngas after treatment in step (1), selectively removing the hydrocarbons in the crude syngas and simultaneously utilizing high temperature produced by oxidation of the hydrocarbons to crack tar, wherein the heat produced in the process can also be used for adjusting the temperature of the crude syngas and thus controlling the reaction temperature in step (3); and (3) Removal of gas pollutants and conditioning: introducing the crude syngas obtained in step (2) into molten salts medium, removing pollutants containing sulfur and chlorine in the crude syngas, and simultaneously adjusting the $H_2/CO$ ratio of the syngas to obtain purified syngas.

The oxidant in step (2) can be a gas oxidant, such as air, oxygen-rich air and oxygen; or a solid oxidant, such as NiO, CuO, $Fe_2O_3$ and $Mn_2O_3$, and the oxidant can be one or more of the above substances. In actual engineering applications, the oxygen-rich air, the oxygen or the solid oxidant is used as far as possible under situations allowed by conditions, and the adoption of the air which can introduce a large amount of inert impurity gas being difficult to removal as the oxidant is avoided. When the solid oxidant is adopted, as the solid oxidant after reduction can be directly oxidized and recovered in the air, part of the cost for preparing the oxygen and the oxygen-rich air can be saved.

The stoichiometric ratio of the amount of the oxidant introduced into the crude syngas to the hydrocarbons in the crude syngas is 0.25-0.35. Under the condition of the stoichiometric ratio, the complete selective conversion of the hydrocarbons in the crude syngas into CO, $H_2$ and a small quantity of $CO_2$ and $H_2O$ can be ensured, and the possibility of oxidizing other gas components in the crude syngas can be reduced as far as possible.

The molten salts medium is a mixture of a hydroxide and a carbonate of Li, Na, K or other alkali metals.

The molten salts medium mixture contains at least one or more alkali metal hydroxides, and the proportion is not less than 10% of the total weight of the mixture; and the specific composition of the molten salts medium can be $NaOH+Na_2CO_3$, $LiOH+Li_2CO_3$, $NaOH+KOH$ or $NaOH+LiOH$. The melting point of each of the molten salts is close to 170° C.-350° C., a certain concentration of the alkali metal hydroxide can be simultaneously ensured to be conductive to absorbing the $CO_2$ in the crude syngas through the molten salts medium, so that the water-gas shift reaction can proceed in the direction of consuming CO to generate $H_2$, which is conductive to adjusting the $H_2/CO$ in the crude syngas.

The operating temperature of the molten salts medium is 200° C.-600° C.; and the molten state of the molten salts can be kept within the temperature range.

Simultaneously, the temperature at a gas outlet of a conventional gasification furnace is 600° C.-1100° C., and the temperature range is very close to the temperature of the crude syngas exhausted from the gas outlet of the conventional gasification furnace so as to be conductive to process matching.

The contact time between the crude syngas and the molten salts medium is more than 0.5 s. Thus, the new method is conductive to oxidation and absorption of reducing and acid pollutants (such as HCl, $H_2S$, HCN, $CS_2$, COS and the like) in the crude syngas through the molten salts and adjustment of $H_2/CO$ and can further prepare the high-quality syngas.

Compared with the prior art, the invention has the following advantages:

1. The hydrocarbons in the syngas are selectively converted in the presence of oxygen, and high temperature produced during the conversion of the gaseous hydrocarbons is utilized for cracking the tar in the crude syngas; and compared with the prior process, the two process steps of removal of the tar and removal of the hydrocarbons are separately performed, the process steps are fewer, and the energy consumption is lower;

2. Selective conversion of the hydrocarbons in the crude syngas, cracking of the tar, removal of $H_2S$ and HCl and adjustment of $H_2/CO$ ratio are completed in a same reactor; and compared with an existing modular stacking process, the process steps are fewer, and the new method is conductive to realizing efficient purification and conditioning of the crude syngas;

3. The molten salts is utilized for converting and absorbing $H_2S$, HCl and other pollutants for removal and adjusting the $H_2/CO$ ratio for conditioning, catalyst is not used during the process, and the disadvantage of deactivation of the existing industrial catalyst is avoided; and 4. The process of the invention is stronger in adaptability and the invention has a simple and compact structure and is easy to amplify.

DETAILED DESCRIPTION OF THE INVENTION

The content of the invention is further described in detail in conjunction with the following figures and specific implementation ways.

Embodiment 1

Figure 1:
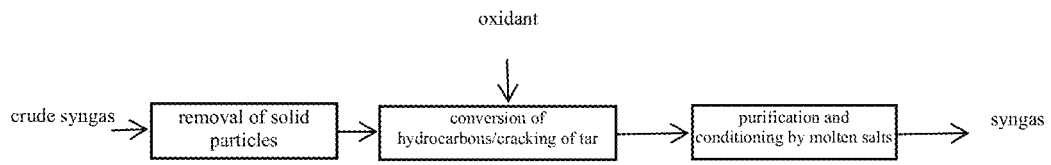
FIG. 1 is a flow diagram of a new method for purification and conditioning of crude syngas based on properties of molten salts of the invention.

As shown in FIG. 1, the embodiment comprises the following steps:

(1) Particles removed at high-temperature: enabling the high-temperature crude syngas produced by a gasification device to firstly pass through a high-temperature particle removal device to remove solid particles in the gas;

(2) Removal of hydrocarbons in the presence of oxygen: introducing an oxidant into the crude syngas after treatment in step (1), selectively removing the hydrocarbons in the crude syngas and simultaneously utilizing high temperature produced by oxidation of the hydrocarbons to crack tar, wherein the heat produced in the process can also be used for adjusting the temperature of the crude syngas and thus controlling the reaction temperature in step (3); and (3) Removal of gas pollutants and conditioning: introducing the crude syngas obtained in step (2) into molten salts medium, removing pollutants containing sulfur and chlorine in the crude syngas, and simultaneously adjusting the $H_2/CO$ ratio of the syngas to obtain purified syngas.

The operating temperature of the molten salts medium is within 400° C.; and the molten state of the molten salts can be kept within the temperature range. Simultaneously, the temperature at a gas outlet of an adopted gasification furnace is 750° C., and the temperature range is very close to the temperature of the crude syngas exhausted from the gas outlet of the used gasification furnace, which is conductive to process matching.

The contact time between the crude syngas and the molten salts medium is more than 1 s. Thus, the embodiment is conductive to oxidation and absorption of reducing and acid pollutants (such as $HCl$, $H_2S$, $HCN$, $CS_2$, $COS$ and the like) in the crude syngas through the molten salts and adjustment of $H_2/CO$ and can further prepare the high-quality syngas.

TABLE 1

Gas Production of Certain Gasification Furnace by Adopting Different Gasification Raw Materials

| No. | $H_2$ (Vol %) | $CH_4$ (Vol %) | CO (Vol %) | $CO_2$ (Vol %) | $C_2H_m$ (Vol %) | $H_2/CO$ | Tar (g/m³) | S (mg/m³) | Cl (mg/m³) |
|---|---|---|---|---|---|---|---|---|---|
| 1 | 30.7 | 4.5 | 34.1 | 28.8 | 1.9 | 0.9 | 14.32 | 20.45 | 682.49 |
| 2 | 26.9 | 5.4 | 34.4 | 31.2 | 2.0 | 0.8 | 14.66 | 38.19 | 765.15 |
| 3 | 28.5 | 5.2 | 35.4 | 29.0 | 1.9 | 0.8 | 10.34 | 60.34 | 1300.58 |

TABLE 2

Syngas Prepared After Treatment by Process of the Invention

| No. | $H_2$ (Vol %) | $CH_4$ (Vol %) | CO (Vol %) | $CO_2$ (Vol %) | $C_2H_m$ (Vol %) | $H_2/CO$ | Tar (g/m³) | S (mg/m³) | Cl (mg/m³) |
|---|---|---|---|---|---|---|---|---|---|
| 1 | 68.2 | 0 | 31.8 | 0 | 0 | 2.1 | 0.01 | 0.031 | ND |
| 2 | 69.5 | 0 | 30.4 | 0.1 | 0 | 2.2 | ND | 0.029 | ND |
| 3 | 69.6 | 0 | 30.4 | 0 | 0 | 2.2 | ND | 0.43 | 1.12 |

Note:
ND refers to non-detected.

The oxidant in step (2) can be oxygen. In actual engineering applications, oxygen-rich air, the oxygen or a solid oxidant is used as far as possible under situations allowed by conditions, and the adoption of air which can introduce a large amount of inert impurity gas being difficult to removal as the oxidant is avoided. The stoichiometric ratio of the amount of the oxidant introduced into the crude syngas to the hydrocarbons in the crude syngas is about 0.3. Under the stoichiometric ratio condition, the complete selective conversion of the hydrocarbons in the crude syngas into CO, $H_2$ and a small quantity of $CO_2$ and $H_2O$ can be ensured, and the possibility of oxidizing other gas components in the crude syngas can be reduced as far as possible.

Figure 2:
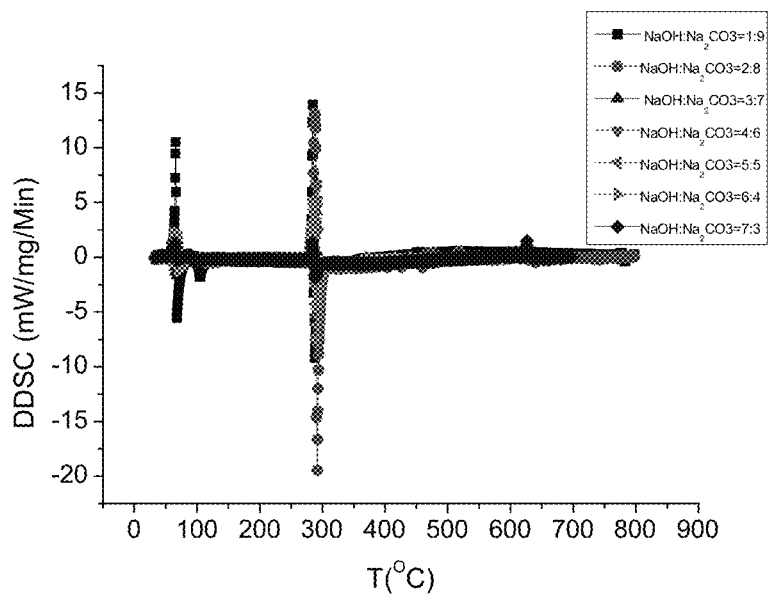
FIG. 2 is a curve diagram of melting point of molten salts, varied along with $m_{NaOH}:m_{Na_2CO_3}$.

The molten salts is $NaOH+Na_2CO_3$, the mass ratio is that $m_{NaOH}:m_{Na_2CO_3}=10:90$, the melting point of the molten salts is close to 293° C., a certain concentration of alkali metal hydroxide can be simultaneously ensured to be conductive to absorbing the $CO_2$ in the crude syngas through the molten salts, so that the water-gas shift reaction can proceed in the direction of consuming the CO to generate the $H_2$, which is conductive to adjusting the $H_2/CO$ in the crude syngas. During the reaction process, NaOH can continuously absorb the $CO_2$ in the crude syngas to become $Na_2CO_3$, FIG. 2 gives out DSC curves of the molten salts with different $NaOH/Na_2CO_3$ ratios, and it can be seen that when the $NaOH/Na_2CO_3$ ratio changes, the molten state of the molten state is unchanged basically, which is conductive to stable proceeding of the reaction process.

Table 1 shows the components of the crude syngas prepared by a certain gasification furnace when the certain gasification furnace adopts RDF as a gasification raw material, the $H_2/CO$ in the gas is low, the content of the tar, the S and the Cl pollutants is high, and the crude syngas is not suitable for being directly used as the syngas. Table 2 shows the components of the syngas obtained after purification by the process provided by the invention. It can be seen that the syngas basically only contains $H_2$ and CO, the $H_2/CO$ ratio is close to 2.1, the content of the tar, the S and the Cl pollutants is very low, and the syngas can be directly used as the raw material of a synthesis process.

Embodiment 2

The oxidant in step (2) can be NiO. The stoichiometric ratio of the amount of the oxidant introduced into the crude syngas to the hydrocarbons in the crude syngas is about 0.35.

In the embodiment, the molten salts adopts NaOH+KOH, the mass ratio is that $m_{NaOH}:m_{KOH}=50:50$, and the melting point of the molten salts is 170° C.;

The operating temperature of the molten salts medium is within 500° C.; and the molten state of the molten salts can be kept within the temperature range.

In addition to the above conditions, other working conditions are the same with the embodiment 1. The prepared syngas is as shown in Table 3.

TABLE 3

Syngas Prepared After Treatment by Process of the Invention

| No. | $H_2$ (Vol %) | $CH_4$ (Vol %) | CO (Vol %) | $CO_2$ (Vol %) | $C_2H_m$ (Vol %) | $H_2$/CO | Tar (g/m$^3$) | S (mg/m$^3$) | Cl (mg/m$^3$) |
|---|---|---|---|---|---|---|---|---|---|
| 1 | 78.7 | 0 | 20.9 | 0.4 | 0 | 3.9 | ND | 0.068 | ND |
| 2 | 80.0 | 0 | 20.0 | 0 | 0 | 4.1 | 0.01 | 0.045 | ND |
| 3 | 79.1 | 0 | 20.9 | 0 | 0 | 3.7 | ND | 0.51 | 1.1 |

Embodiment 3

The oxidant in step (2) can be $Fe_2O_3$ and 50% oxygen-rich air. The stoichiometric ratio of the amount of the oxidant introduced into the crude syngas to the hydrocarbons in the crude syngas is about 0.25.

In the embodiment, the molten salts adopts NaOH+LiOH, the mass ratio is that $m_{NaOH}$:$m_{LiOH}$=75:25, and the melting point of the molten salts is 215° C.;

The operating temperature of the molten salts medium is within 600° C.; and the molten state of the molten salts can be kept within the temperature range.

In addition to the above conditions, other working conditions are the same with embodiment 1. The prepared syngas is as shown in Table 4.

TABLE 4

Syngas Prepared After Treatment by Process of the Invention

| No. | $H_2$ (Vol %) | $CH_4$ (Vol %) | CO (Vol %) | $CO_2$ (Vol %) | $C_2H_m$ (Vol %) | $H_2$/CO | Tar (g/m$^3$) | S (mg/m$^3$) | Cl (mg/m$^3$) |
|---|---|---|---|---|---|---|---|---|---|
| 1 | 90.5 | 0.8 | 8.5 | 0.2 | 0 | 10.6 | ND | 0.08 | ND |

* Component after removal of $N_2$

The above detailed description is used for specifically describing the feasible embodiments of the invention, the embodiments are not used for limiting the scope of the patent of the invention, and all equivalent implementations or alternations without departing from the invention shall be encompassed in the patent protection scope of the invention.

We claim:

1. A new method for purification and conditioning of crude syngas based on properties of molten salts, comprising the following steps:
    (1) removing particles at a high-temperature by enabling the high-temperature crude syngas produced by a gasification device to firstly pass through a high-temperature particle removal device to remove solid particles in the gas;
    (2) removing hydrocarbons in the presence of oxygen by introducing an oxidant into the crude syngas after treatment in said step (1), selectively removing the hydrocarbons in the crude syngas and simultaneously utilizing high temperature produced by oxidation of the hydrocarbons to crack tar; and
    (3) removing gas pollutants and conditioning by introducing the crude syngas obtained in said step (2) into molten salts medium, removing pollutants containing sulfur and chlorine in the crude syngas, and simultaneously adjusting the $H_2$/CO ratio of the syngas to obtain purified syngas, wherein the molten salts medium is a mixture of a hydroxide and a carbonate of Li, Na, K or other alkali metals.

2. The new method for purification and conditioning of the crude syngas based on the properties of the molten salts according to claim 1, wherein the oxidant in said step (2) is selected from one or more of gas oxidants, including air, oxygen-rich air and oxygen; or of solid oxidants, including NiO, CuO, $Fe_2O_3$ and $Mn_2O_3$.

3. The new method for purification and conditioning of the crude syngas based on the properties of the molten salts according to claim 1, wherein the stoichiometric ratio of the amount of the oxidant introduced into the crude syngas in said step (2) to the hydrocarbons in the crude syngas is 0.25-0.35.

4. The new method for purification and conditioning of the crude syngas based on the properties of the molten salts according to claim 1, wherein the molten salts medium contains at least one or more alkali metal hydroxides, and the proportion is not less than 10% of the total weight of the mixture.

5. The new method for purification and conditioning of the crude syngas based on the properties of the molten salts according to claim 1, wherein the composition of the molten salts medium is selected from one of NaOH+$Na_2CO_3$, LiOH+$Li_2CO_3$, NaOH+KOH and NaOH+LiOH.

6. The new method for purification and conditioning of the crude syngas based on the properties of the molten salts according to claim 1, wherein the operating temperature of the molten salts medium is 200° C.-600° C.

7. The new method for purification and conditioning of the crude syngas based on the properties of the molten salts according to claim 1, wherein the contact time between the crude syngas and the molten salts medium is more than 0.5 s.

8. The new method for purification and conditioning of the crude syngas based on the properties of the molten salts according to claim 2, wherein the stoichiometric ratio of the amount of the oxidant introduced into the crude syngas in said step (2) to the hydrocarbons in the crude syngas is 0.25-0.35.

* * * * *